United States Patent
Bossard et al.

(10) Patent No.: US 6,438,359 B1
(45) Date of Patent: Aug. 20, 2002

(54) DUAL TRANSMITTER ARRANGEMENT WITH BACK-UP SWITCHING

(75) Inventors: Bernard Bossard, New York, NY (US); Charles Brand, Colts Neck, NJ (US)

(73) Assignee: Cellularvision Technology & Telecommunications, L.P., Freehold, NJ (US)

( * ) Notice: Subject to any disclaimer, the term of this patent is extended or adjusted under 35 U.S.C. 154(b) by 0 days.

(21) Appl. No.: 08/684,651

(22) Filed: Jul. 19, 1996

(51) Int. Cl.[7] ............................................. H04B 1/02
(52) U.S. Cl. ........................ 455/103; 455/115; 348/723
(58) Field of Search .................... 455/8, 9, 67.1, 455/103, 115, 117, 59, 561; 395/20.1, 182.08, 182.09, 182.11, 182.02; 371/8.2, 9.1, 11.2; 348/724, 723; 714/2

(56) References Cited

U.S. PATENT DOCUMENTS

| 3,778,716 A | * | 12/1973 | Stokes | 325/49 |
| 4,287,598 A | * | 9/1981 | Langseth et al. | 455/52 |
| 4,429,417 A | * | 1/1984 | Yool | 455/291 |
| 4,940,984 A | * | 7/1990 | Kleiber | 342/173 |
| 5,274,836 A | * | 12/1993 | Lux | 455/1 |
| 5,487,185 A | * | 1/1996 | Halonen | 455/127 |
| 5,737,698 A | * | 4/1998 | Gabrelian et al. | 455/286 |

* cited by examiner

Primary Examiner—Andrew Faile
Assistant Examiner—Christopher Onuaku
(74) Attorney, Agent, or Firm—Woodbridge & Associates, P.C.; Richard C. Woodbridge

(57) ABSTRACT

Reliable transmission of signals in a multi-channel system is achieved by transferring signal inputs from a defectively operating or inoperative transmitter to another transmitter which continues to transmit other channels. At least two transmitters are operated normally, each transmitting its own block of channels. A sensor detects when the output of one transmitter is improper or non-existent, and causes a change-over switch to operate. Operation of the switch adds the block of channels which had come from the one transmitter to the other (or one or more) of the transmitters, so that the remaining transmitter or transmitters now provide all the channels.

14 Claims, 2 Drawing Sheets

DUAL TRANSMITTER ARRANGEMENT WITH BACK-UP SWITCHING

BACKGROUND OF THE INVENTION

1. Field of the Invention

The invention relates to transmitter arrangements for multi-channel operation, and more particularly to arrangements in which switch-over to a back-up transmitter is desirable.

2. Description of the Prior Art

To prevent direct revenue loss, and loss of subscriber or listener loyalty, most commercial radio and television transmitter arrangements include some provision for continued broadcasting even though a portion of the regular transmitter has failed. Sometimes an entire duplicate transmitter and modulator are provided. However, such arrangements are quite expensive, so a common arrangement includes a back-up transmitter of less than half the power of the main transmitter. Antenna connections and. low level signal inputs usually must be changed from one transmitter to the other, and the back-up transmitter may require a significant warm-up time to provide stable operation. These make automatic switch over difficult and cause an undesirably long service interruption.

SUMMARY OF THE INVENTION

According to the invention, a multi-channel transmitting arrangement includes two transmitters, each of which in normal operation transmits a block of signals for approximately half the total bandwidth to a communications device such as a cable, waveguide or antenna; when the channels are similar, each transmits half the channels. In the event of failure of one of the transmitters, the signals for the block or channels it has been transmitting are provided to the other transmitter, which then transmits all the channels. Preferably the power transmitted per channel will remain substantially unchanged, although it may not be possible or practical to avoid an increase in distortion. Alternatively, the power level per channel may be reduced.

In normal operation, one block of channels may occupy the lower half of a band, and the other block occupies the upper half. An alternative arrangement may use two blocks with interleaved channels, where each block is spread over nearly the entire same band.

Because high level switching of antenna connections is not required, an arrangement according to the invention is relatively easy to automate, and no warm-up time is lost.

Whenever, in normal operation, each transmitter is operated below its maximum power output, for example to improve operating life or to reduce distortion, it is usually practicable that the back-up mode provide for transmission at the same power level per channel, so that service area coverage is not reduced. This is particularly applicable when adaptive power control is used to vary the transmitting power to accommodate time-varying changes in signal propagation over the service area, and the transmitters may be expected to be operating normally well below saturation.

In situations where signal attenuation in the service area fluctuates widely over the course of a year, transmitter operating cost considerations may make it desirable to operate the system such that, when minimum transmitter power will suffice, it is possible to turn off or to put one transmitter in a standby mode, and to use the switch to transfer all channels to the other transmitter. Where this mode is otherwise practicable, an important consideration will be the time required to activate, warm up or stabilize the transmitter which is not being actively used, so that high reliability of service can be maintained.

In a preferred embodiment, the transmitting arrangement handles a plurality of television or similar wide-band channels at frequencies above 10 to 12 GHz, such as a 1 GHz band between 27.5 and 28.5 GHz. For output powers of 120 watts per block, one traveling wave tube for each block of 25 FM channels provides sufficient power per channel to provide omnidirectional coverage out to a 3 mile radius. In normal operation, the lower frequency tube transmits channels 1–25 at 27.5 to 28.0 GHz, and the upper tube transmits channels 26–50 at 28.0 to 28.5 GHz.

In another embodiment, each transmitter includes a plurality of solid state amplifying or mixing/amplifying devices connected to one or a like plurality of antenna elements. Where each such device normally provides power for one small frequency block or respective channel of a large number of channels being transmitted, under standby operation each device would then transmit two such blocks or channels.

At some sacrifice in added complexity, the same inventive principle can be applied in situations where it is desired to have more than two amplifiers handling respective portions of the spectrum, and in the event of failure or poor performance by one, this portion can be shared among the others, or can be added in its entirety to the block transmitted by another.

DESCRIPTION OF THE PREFERRED EMBODIMENT

Figure 1:
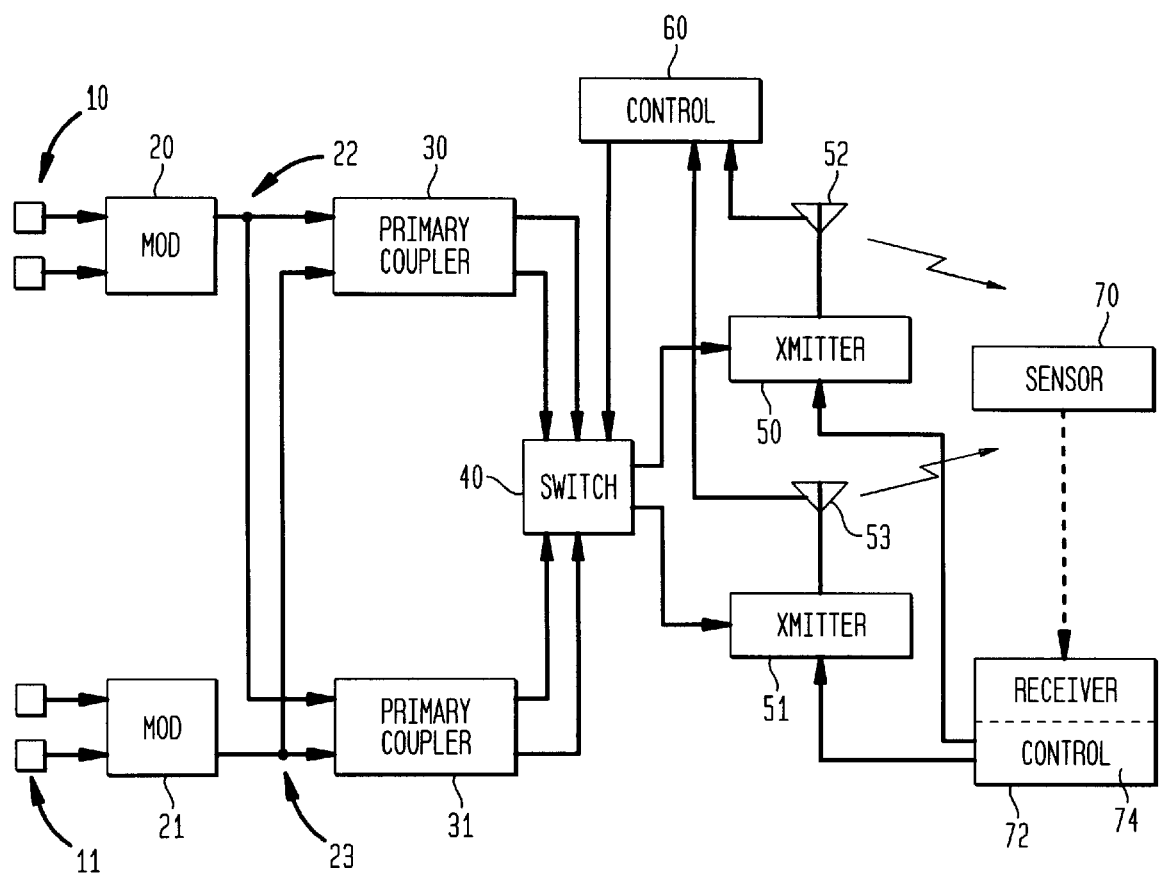
FIG. 1 is a schematic diagram of a cellular transmitting arrangement in accordance with the invention.

The system shown schematically in FIG. 1 includes two pluralities of signal sources 10 and 11, which are respectively modulated and combined in modulators 20 and 21 to provide blocks of signals 22 and 23. Each block of signals may include channels of different types, modulation characteristics and individual bandwidth, or could be a single broadband channel; it is not necessary that more than one signal source 10 or 11 be involved. In fact, the combined blocks 22 and 23 could represent one very wide band program material which, because of limitations on transmitter or receiver technology, or some other reason, is preferably transmitted in two portions over respective transmitters.

The signal blocks 22 and 23 are each input to a primary coupler 30 and a standby coupler 31. These couplers are normally identical, and may be simple signal combining devices or active devices such as frequency converters. Each coupler has two outputs, one containing signals corresponding to block 22, and the other containing signals corresponding to block 23. The four outputs are input to a switch 40, which would usually be automatically electrically controlled. The switch has two outputs, one providing signals to transmitter 50 and the other to transmitter 51. Transmitter 50 has its output fed to antenna 52, and transmitter 51 has its output fed to antenna 53. Of course, where it is technologically feasible, the outputs of both transmitters can be fed to one antenna, so long as failure of one transmitter will not load the other because of coupling through the antenna or its feed.

A control 60 is connected to sense loss of output from either of the transmitters 50 and 51. The sensing is shown as coming from the respective antennae 52 and 53, but it will be clear that loss of transmitter output can be sensed at other locations within the transmitter and feed combination, or remote from the antenna. The control 60 has an output which is connected to cause operation of the switch 40.

In normal operation, switch 40 is set so that the output signals from primary coupler 30 corresponding to block 22 are input to transmitter 50, and the output signals from primary coupler 31 corresponding to block 23 are input to transmitter 51. In the event of loss of output from one of the transmitters (or any other failure affecting output from one only of the transmitters), the switch 40 is set to couple signals from the standby coupler 31 to the transmitter whose output had been normal.

According to another feature of the invention, the control 60 can be connected to an adaptive power control circuit, so that the adaptive power control circuit provides the output loss signal to the control 60, or can use the transmitting power control to affect a change in output power per channel automatically upon switching to the standby mode. The adaptive power control circuit may includes one or more sensors 70 provided at different locations within the transmitter service area, which transmit by wire (e.g., telephone lines, or telemetry signals such as "carrier current" over local power lines) or radio or other link to a unit 72 at the transmitter site. The unit includes a control portion 74 which provides power controlsignals; and a receiver portion 76 which receives the radio or other link signals from the sensor or sensors. The power level control is shown as being performed at the transmitters 50, 51. However, depending upon the choice of equipment and modulation or frequency converting arrangement, it may be preferable to control transmitter power level by affecting circuits in the couplers 30, 31 or modulators 20, 21.

The sensors 70 can be provided at one or more predetermined, fixed locations. Alternatively, some or all of the normal service receivers, such as customer premises equipments, may be equipped for two-way operation. In that case the receiving sections at those service receiving sites can be polled periodically to provide a report signal related to the signal strength being received at the individual site. Where propagation is affected heavily by rainfall, such a system provides a higher likelihood of identifying the effect of small intense rain cells.

Figure 2:
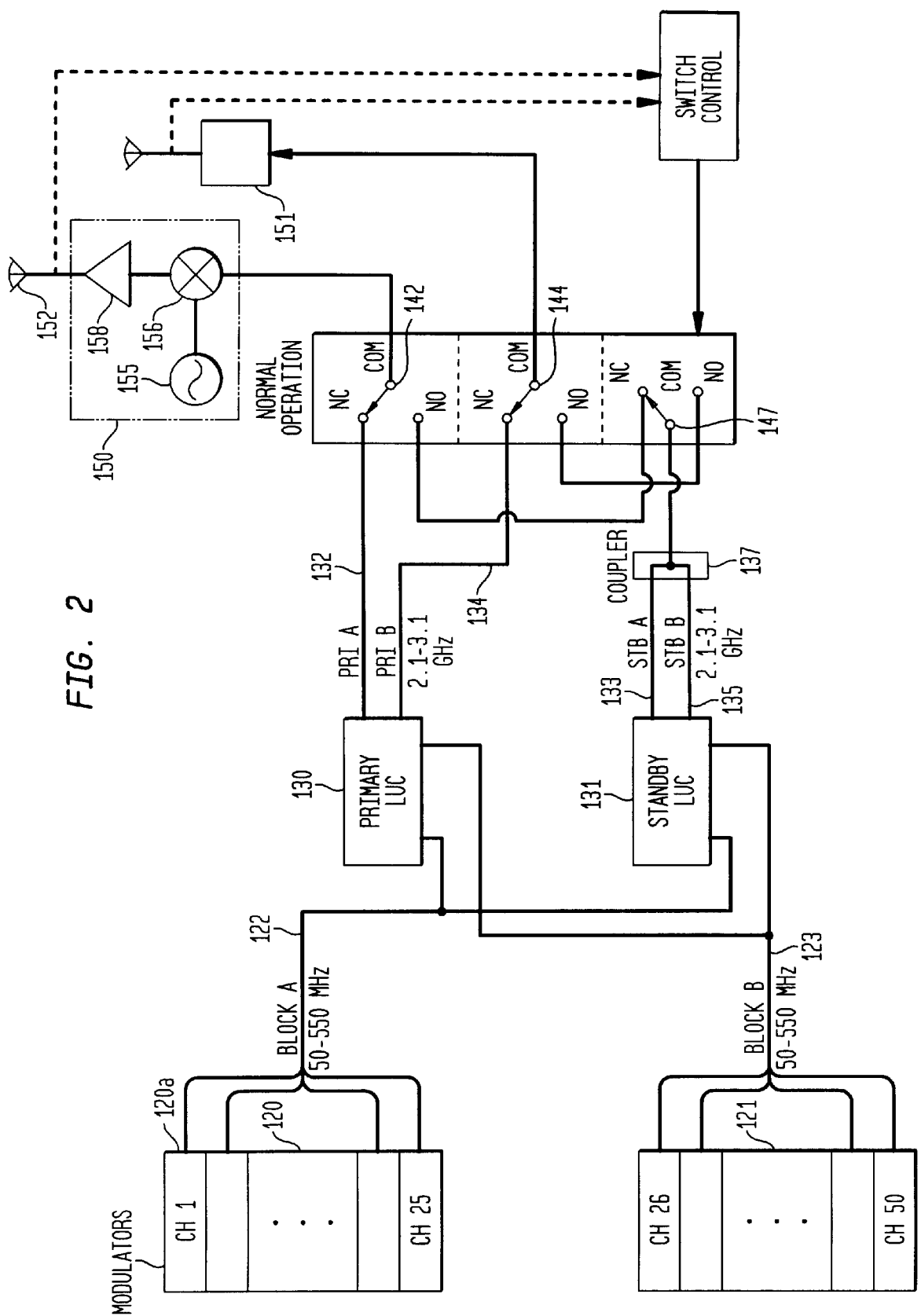
FIG. 2 is a schematic diagram of a switching arrangement for use with the invention.

The switching arrangement shown in FIG. 2 is especially adapted for transmission of a large number of FM television channels having a nominal bandwidth of 20 MHZ each. Of course, one or more channels can have wider or narrower bandwidth, and can carry digital or other signals at varying bit or burst rates. There is no need that the number of channels or their spacing be the same for the two blocks.

Frequency agile modulator blocks 120 and 121 each contain 25 individual modulators such as 120*a*, and take input signals (not shown) which may be baseband signals or may themselves be higher frequency signals such as ISDN or T-1 or E-1 signals, and modulate them at different channel frequencies. The outputs of modulator blocks 120, 121 are blocks of signals 122, 123 between 50 and 550 MHZ, so that a total of 1 GHz of channel space is being provided without need for modulators which will operate at or above 1 GHz. Each of these blocks is input to a primary L-band upconverter 130 and a standby L-band upconverter 131.

In this embodiment the two upconverters are identical. They have respective outputs of two signal blocks 132, 134 and 133, 135. Blocks 132 and 133 contain signals between 2.1 GHz and 2.6 GHz, and blocks 134 and 135 contain signals between 2.6 GHz and 3.1 GHz. The blocks 133 and 135 are then combined in a coupler 137 to form a block between 2.1 GHz and 3.1 GHz, and provided to a common terminal of a single pole, double throw coaxial switch 147 which is part of a three independent section electrically controlled switch 140. For normal operation, over a normally closed contact set whose common contact is connected to a mixer 154 of a transmitter 150, a switch section 142 connects the block 132 to the input of the transmitter 150; similarly, over a normally closed contact set switch section 144 connects block 134 to a transmitter 151.

In the event that transmitter 151 is sensed to have improper or no output, control 160 cause switch 142 to be operated to connect the input to mixer 156 to a normally open contact which in turn is connected to a normally closed contact of switch 147, thereby providing the signals forming blocks 133 and 135 to the mixer 156. At the same time, switch 144 is operated. The normally open contact of switch 144 is connected to a normally open contact of switch 147, so that the input to transmitter 151 is interrupted.

In the event that transmitter 150 is sensed to have improper or no output, switch 144 is operated to connect the input to transmitter 151 to the normally open contact which in turn is connected to the normally open contact of switch 147. Simultaneously, switch 147 is operated to connect signals from the coupler 137 to its normally open contact, thereby providing the signals forming blocks 133 and 135 to the transmitter 151. At the same time, switch 142 is set to the normally open contact which is connected to the normally closed contact of switch 147, so that the input to transmitter 150 is interrupted.

In this embodiment, transmitter 150 includes an oscillator 155 connected to the mixer 156, to upconvert the L-band IF signals to the 27.5 to 28.5 GHz band. The 28 GHz band signals are then amplified in a traveling wave tube amplifier 158 which is connected to the antenna 152.

The inventive arrangement is usable whether or not transmitter distortion cancellation techniques are included. Such techniques may, for example, include feed forward, or predistortion.

It will be noted that the preferred embodiment is optimized for transmission over a 1 GHz continuous band. If frequencies allocated for service are not in one contiguous band, different variations may be preferred. For example, if transmission is permitted from 27.5 to 28.35 GHZ and from 29.1 to 29.25 GHZ, and possibly also from 31 to 31.3 GHz, practical limitations on the equipment may require careful optimization. For example, it may be preferred, if only the two frequency bands below 30 GHz are utilized, to extend the IF band to a total of 1.75 GHz, and to leave a portion with no signal. This has the advantage that only one upconversion is required, but it greatly widens the pass band required for the IF. Alternatively, the modulators can be set to provide just sufficient empty band between those channels below 28.35 GHz and those above, so that sharp cut-off filters in the transmitter can feed the lower blocks to one upconverter (mixer and oscillator) and the upper block to another upconverter. The latter technique appears more suitable if the band above 30 GHz is also to be utilized Many other variations using the invention will become clear to those of ordinary skill, upon reading this application. For example, the split band described above, where three somewhat separated blocks of frequency are used, may be optimized by use of more than two transmitting sections, and at some additional cost each, or selected ones, of the transmitting sections may have filters or other circuits permitting transmission, when operating in the back-up mode, at frequency bands separated from that normally transmitted. It will be clear that different bands or channels may not only have different bandwidths, but may contain markedly different signal types or be differently modulated. Although undesirable from the standpoint of complexity, back-up operation in which the added block is transmitted with a different polarization is also possible. Accordingly, the scope of the invention should be measured only by the appended claims.

What is claimed is:

1. A transmitting arrangement for multi-channel operation, comprising:
    two transmitters each having a respective input and a respective output,
    means for connecting the respective outputs to at least one communication element,
    means for providing first input signals, corresponding to at least a first channel in a first portion of a frequency band, to the input of a first of said transmitters,
    means for providing second input signals, corresponding to at least a second channel in a second portion of said frequency band not including said first portion, to the input of the second of said transmitters,
    means for sensing a loss of output signals from one of said transmitters, and
    means, responsive to sensing of a loss of output signals from said one of said transmitters, for providing both input signals to the input of the other of said transmitters, whereby said other of the transmitters then transmits said first and second channels.

2. An arrangement as claimed in claim 1, characterized in that said at least one communication element is a pair of antennas, each transmitting the output of a respective transmitter.

3. An arrangement as claimed in claim 2, characterized in that each of said antennae is an omnidirectional antenna.

4. An arrangement as claimed in claim 1, characterized in that each of said transmitters includes a frequency converter unit and an RF output unit.

5. An arrangement as claimed in claim 4, characterized in that the frequency converter unit is an upconverter, and the RF units comprise an output amplifier.

6. An arrangement as claimed in claim 4, characterized in that each of said RF units comprises a traveling wave tube, said communications device is a microwave antenna, and said means for connecting comprises a waveguide.

7. An arrangement as claimed in claim 1, characterized in that each of said transmitters transmits substantially the same power per channel when transmitting both said input signals as when transmitting only a respective one of said input signals.

8. An arrangement as claimed in claim 1, characterized in that:
    each of said means for providing comprises sources for a respective plurality of signals at respective frequencies, and means for combining each of said respective plurality of signals into a respective radio frequency band,
    the two means for providing together comprise a primary upconverter having two outputs,
    the means for providing both output signals comprises a standby upconverter, and a switching device, and
    said means for sensing comprises a switch control for providing a control signal to said switching device.

9. An arrangement as claimed in claim 8, characterized in that for standby operation said means for connecting connects the standby upconverter outputs respectively to a common terminal, and for normal operation said means for connecting comprises means for connecting the primary upconverter outputs respectively to the two block transmitters.

10. A transmitting arrangement for multi-channel operation, comprising:
    a plurality of transmitters each having a respective input and a respective output,
    means for connecting the respective outputs to at least one communication element,
    means for providing first input signals, corresponding to at least a first channel in a first portion of a frequency band, to the input of a first of said transmitters,
    means for providing second input signals, corresponding to at least a second channel in a second portion of said frequency band not including said first portion, to the input of a second of said transmitters,
    means for sensing a loss of output signals from one of said transmitters, and
    means, responsive to sensing of a loss of output signals from said one of said transmitters other than said first transmitter, for providing at least a portion of the input signals normally provided to the input of said one of said transmitters to said first transmitter, whereby said first transmitter then transmits signals corresponding to said first signals and signals corresponding to said portion.

11. An arrangement as claimed in claim 10, characterized in that said portion includes all of the input signals normally provided to the input of said one of said transmitters.

12. An arrangement as claimed in claim 10, characterized in that the arrangement further comprises control means for adaptive power control of said transmitters,
    said means for sensing comprises at least one sensor for determining signal strength at a location within the transmitting arrangement service area,
    said control means is responsive to signals from said at least one sensor for controlling transmitter power level from at least said one of said transmitters during normal operation, and responsive to an output loss signal from said sensor,
    said control means causes said means for providing to provide said portion of the input signals to said first transmitter.

13. An arrangement as claimed in claim 12, characterized in that, responsive to said output loss signal, said control means controls transmitter power level from said first transmitter.

14. An arrangement as claimed in claim 12, characterized in that, responsive to said output loss signal, said control means affects a change in output power per channel from said first transmitter.

* * * * *

UNITED STATES PATENT AND TRADEMARK OFFICE
CERTIFICATE OF CORRECTION

PATENT NO. : 6,438,359 B1
DATED : August 20, 2002
INVENTOR(S) : Bernard Bossard et al.

It is certified that error appears in the above-identified patent and that said Letters Patent is hereby corrected as shown below:

<u>Title page,</u>
Item [*] Notice, delete "0" and insert -- 743 --.

Signed and Sealed this

Twenty-third Day of March, 2004

JON W. DUDAS
*Acting Director of the United States Patent and Trademark Office*